United States Patent [19]

Isobe et al.

[11] 4,401,906
[45] Aug. 30, 1983

[54] MOTOR WITH IMPROVED TEMPERATURE CHARACTERISTICS

[75] Inventors: Minoru Isobe; Hiroshi Kikuchi, both of Tokyo, Japan

[73] Assignee: Oki Electric Industry Co., Ltd., Tokyo, Japan

[21] Appl. No.: 242,205

[22] Filed: Mar. 10, 1981

[30] Foreign Application Priority Data

Mar. 17, 1980 [JP] Japan .................................. 55-32603

[51] Int. Cl.$^3$ ............................................. H02K 21/12
[52] U.S. Cl. ....................................... 310/156; 310/190
[58] Field of Search ................................. 310/190–193, 310/156, 261, 68 C, 262

[56] References Cited

U.S. PATENT DOCUMENTS

| | | | |
|---|---|---|---|
| 2,146,588 | 2/1939 | Merrill | 310/154 |
| 2,193,675 | 3/1940 | Merrill | 310/154 X |
| 2,245,268 | 6/1941 | Goss et al. | 310/156 X |

Primary Examiner—Donovan F. Duggan

Attorney, Agent, or Firm—Allison C. Collard; Thomas M. Galgano

[57] ABSTRACT

The temperature characteristics of a motor which has a ferrite permanent magnet has been improved. The present motor comprises a stator assembly having at least a yoke for providing a magnetic path and a coil wound on said yoke, and a rotor assembly rotatably inserted in said stator assembly, having at least an elongated spindle rotatably supported by said yoke, and a cylindrical permanent magnet made of a ferrite material pierced by said spindle and being symmetrical wth respect to said spindle, said spindle being made of adjusting alloy or adjusting steel having the magnetic characteristics that the magnetic reluctance of the same increases as the temperature of the same increases, and said yoke is made of steel having the magnetic characteristics that the magnetic reluctance is constant irrespective of the change of the temperature. Although the temperature change causes the change of the flux from the ferrite permanent magnet, that change is compensated by the adjusting material of the spindle, and the effective flux which links with the coil of the stator assembly can be constant irrespective of the change of the temperature.

2 Claims, 12 Drawing Figures

Fig. 6    Fig. 5
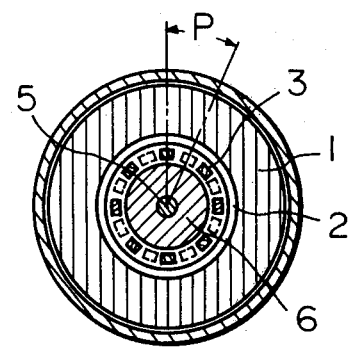
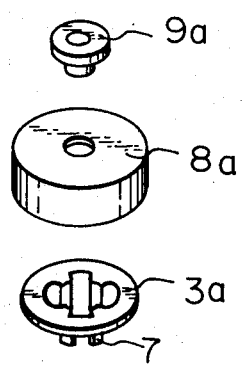
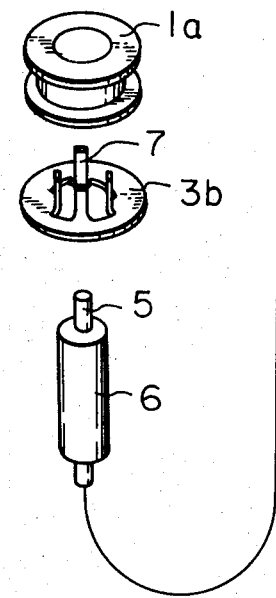
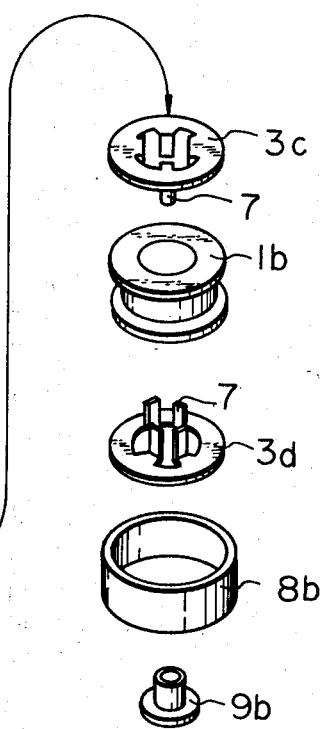

MOTOR WITH IMPROVED TEMPERATURE CHARACTERISTICS

BACKGROUND OF THE INVENTION

The present invention relates to the improvement of a motor and, in particular, a pulse motor or a stepping motor which provides the constant torque in spite of the change of the temperature. A prior pulse motor or a stepping motor is disclosed, for instance, in the U.S. Pat. No. 4,127,802, and/or the U.S. patent application Ser. No. 969,376, and in a prior pulse motor a magnetically toothed rotor and a stator having a coil are provided. A rotor has a permanent magnet. Upon application of a pulse signal to a coil on a stator, a rotor rotates by a predetermined angle.

In a prior pulse motor, a permanent magnet on a rotor and/or a rotor itself is made of a ferrite material, which is inexpensive. However, a ferrite material has the disadvantage that the magnetic reluctance of ferrite material is increased when the temperature is high. Accordingly, when the temperature of a motor is high, the flux by a permanent magnet is reduced, and in turn, the torque of a motor is reduced. Since the temperature of a motor increases during long continuous use, the shortage of the torque of a motor is inevitable.

In order to solve the above problem, a larger motor which provides a higher torque must be utilized so that the high torque is obtained even at the high temperature condition. Therefore, the size of a motor must be large and the weight of a motor must be heavy as compared with a motor which operates only in a low temperature condition.

SUMMARY OF THE INVENTION

It is an object of the present invention, therefore, to overcome the disadvantages and limitations of a prior motor by providing a new and improved motor.

It is also an object of the present invention to provide a pulse motor which has a high torque even in a high temperature condition.

The above and other objects are attained by a motor comprising a stator assembly having at least a yoke for providing a magnetic path and a coil wound on said yoke, and a rotor assembly rotatably inserted in said stator assembly, having at least an elongated spindle rotatably supported by said yoke, and a cylindrical permanent magnet made of ferrite material pierced by said spindle and being symmetrical with respect to said spindle, said spindle being made of adjusting material having the magnetic characteristics that the magnetic reluctance of the same increases as the temperature of the same increases, and said yoke is made of steel having the magnetic characteristics that the magnetic reluctance of the same is constant irrespective of the change of the temperature.

In a preferred modification of the present invention, the spindle of the motor has the coaxial structure with the center steel shaft having the constant magnetic reluctance irrespective of the change of the temperature, and the cylindrical adjusting material covering said shaft.

BRIEF DESCRIPTION OF THE DRAWINGS

The foregoing and other objects, features, and attendant advantages of the present invention will be appreciated as the same become better understood by means of the following description and accompanying drawings wherein:

FIG. 5 is the cross sectional view at the line B-B' of FIG. 1;

FIG. 6 is the disassembled view of the pulse motor of FIG. 1;

DESCRIPTION OF THE PREFERRED EMBODIMENTS

Figure 1:
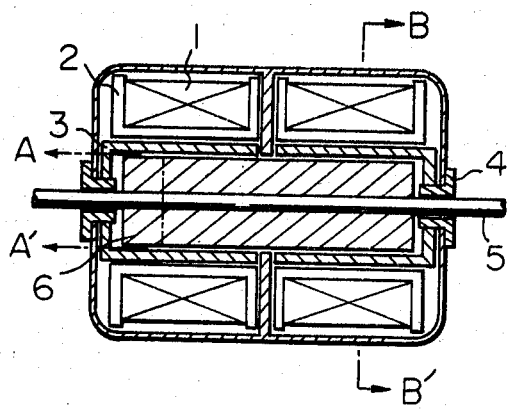
FIG. 1 is a cross sectional view of a motor according to the present invention.

FIG. 1 shows the cross sectional view of the motor according to the present invention. In the figure, the reference numeral 1 is a stator coil wound on a bobbin 2, 3 is a yoke for providing a magnetic path, 4 is a bearing for rotatably supporting a motor axis or a spindle 5, and 6 is a cylindrical permanent magnet of a ferrite material fixed to said motor axis 5. Upon application of a pulse input signal on a coil 1, the rotor and the axis rotates by a predetermined angle for each pulse input signal.

FIG. 5 shows the cross sectional view at the line B-B' and it should be noted that the teeth of the yoke 3 has the pitch p. The dotted line shows the teeth of the second (II) phase, and the solid line shows the teeth of the first (I) phase. In the embodiment of FIG. 5, the pitch (p) is 22.5 (=360/16) degrees.

FIG. 6 is the disassembled view of the motor of FIG. 1. In FIG. 6, the reference numeral 1a is a coil of the first phase, 1b is the coil of the second phase, 3a, 3b, 3c and 3d are the first, the second, the third and the fourth yokes, respectively, each having four teeth 7 positioned with the pitch of 90 degrees. Those teeth 7 are provided through the stamping process and the folding process. Those yokes are positioned so that the teeth 7 are positioned with the pitch of 22.5 degrees as a whole. The 8a and 8b are covers, and 9a and 9b are bearings. It is supposed that the covers 8a and 8b are coupled together by welding when those components are assembled.

The operation of the motor is described in accordance with FIGS. 7A through 7D and FIG. 8. For the sake of simplicity of the explanation, it is assumed that the yokes 3 have four teeth, and the magnet 6 has two magnetic poles.

Figure 7A:
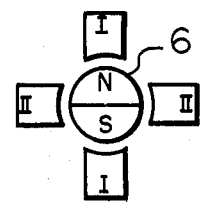
FIGS. 7A through 7D are the explanatory drawings for the explanation of the operation of the pulse motor of FIG. 1.

When no coil is energized, the magnetic poles N,S of the magnet 6 confront with the teeth of the yoke 3, and the rotor stops (see FIG. 7A).

Next, it is assumed that the signal of FIG. 8A is applied to the coil 1a of the first phase (I), and the signal of FIG. 8B is applied to the coil 1b of the second phase (II).

Figure 7B:
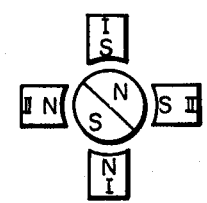
Figure 8:
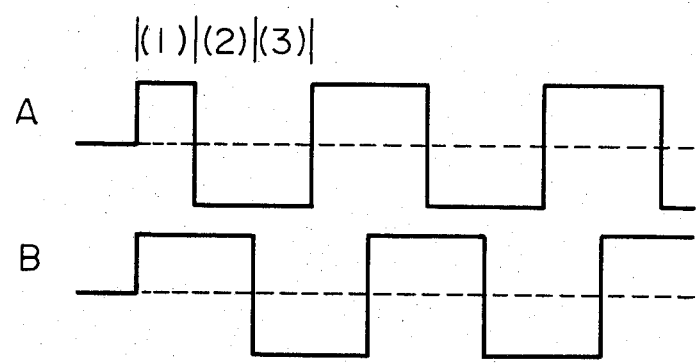
FIG. 8 is the diagram showing the waveform of the current applied to the present pulse motor.

In the duration (1) of FIG. 8, the teeth of the yoke 3 are magnetized as shown in FIG. 7B, and then, the rotor assembly having the magnet 6 and the spindle 5 rotates by 45 degrees in the clockwise direction as shown in FIG. 7B.

Figure 7C:
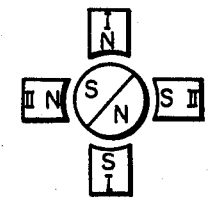

In the duration (2) of FIG. 8, the teeth of the yoke 3 are magnetized as shown in FIG. 7C, and the rotor assembly rotates further by 90 degrees in the clockwise direction (see FIG. 7C).

Figure 7D:
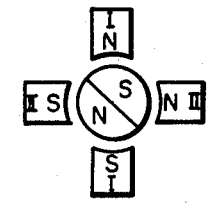

Next, in the duration (3) of FIG. 8, the teeth of the yoke 3 are magnetized as shown in FIG. 7D, and said rotor assembly rotates further by 90 degrees in the clockwise direction (see FIG. 7D).

Therefore, the rotor assembly rotates by 90 degrees every time the direction of the current in the coil $1a$ or $1b$ changes (except the initial status of the duration (1) of FIG. 8), when the coils $1a$ and $1b$ receive the two-phase alternate pulse current having the 90 degrees phase difference as shown in FIG. 8.

Figure 9:
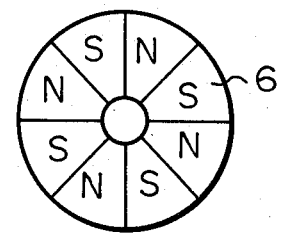
FIG. 9 shows the magnetic poles of the permanent magnet of the rotor assembly of the motor of FIG. 1.

The embodiment of FIG. 6 has the yokes 3 with eight teeth for each phase (16 teeth for both the phases), and so the rotational angle for every change of the current is 22.5 (=360/16) degrees, but is not 90 degrees. Also, the rotor of FIG. 6 is supposed to have eight magnetic poles so that the N-pole and the S-pole are arranged alternately as shown in FIG. 9.

Next, the characteristics of the motor when the temperature is changed, are explained.

The axis or the spindle 5 of the motor is made of adjusting steel or adjusting alloy in which the magnetic reluctance increases as the temperature of the spindle 5 becomes high, that is to say, the magnetic flux in the axis 5 decreases in a high temperature. Preferably, that adjusting alloy is Fe-Ni-Co alloy which is supplied, for instance, by Sumitomo Tokushu Kinzoku Co. Ltd in Tokyo, Japan in the trade name MS-1, MS-2 and MS-3. In case of MS-2, the temperature coefficient of the flux density is $-0.8\%/°C$.

Figure 2:
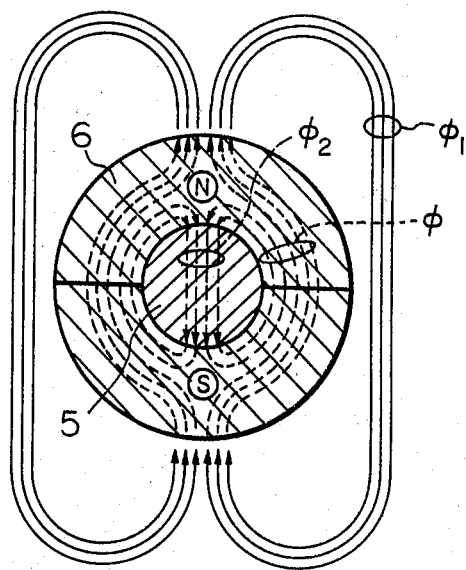
FIG. 2 is a cross sectional view at the line A-A' of FIG. 1.
Figure 3:
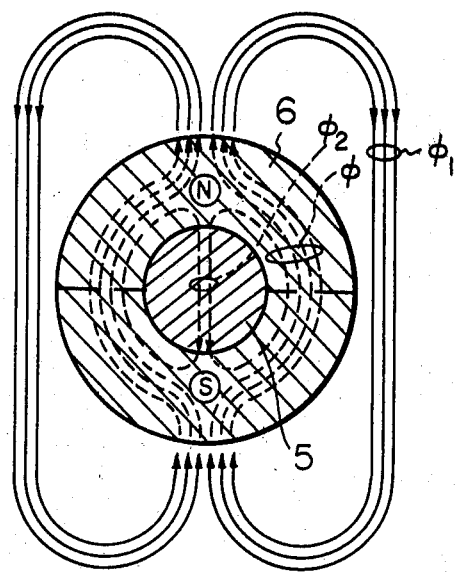
FIG. 3 is the same view as FIG. 2, but at the high temperature condition.

The distribution of the flux in the motor of FIG. 1 is explained in accordance with FIGS. 2 and 3.

It is assumed that the permanent magnet of a ferrite material provides the flux $\phi$. Some portion $\phi_1$ of that total flux $\phi$ passes outside of the rotor and links with the stator coil 1 to provide the torque of the motor, and the other portion $\phi_2$ of said flux $\phi_1$ passes through the rotor axis 5, and the following formula is satisfied.

$$\phi = \phi_1 + \phi_2$$

When the temperature of the rotor is low, the permanent magnet provides much flux and the value of the total flux $\phi$ is large. This status is shown in FIG. 2.

Next, when the temperature of the magnet 6 is high, the permanent magnet 6 provides less flux and the value of the total flux $\phi$ is small as shown in FIG. 3. It should be noted in this case that the axis 5 which is rigidly fixed to the magnet 6 is at almost the same temperature as that of the magnet 6, and therefore, the flux $\phi_2$ in the axis 5 decreases due to the high temperature. Therefore, if the motor is properly designed so that the decrease of the flux $\phi_2$ in the axis 5 is almost the same as the decrease of the total flux $\phi$ in a high temperature condition, the rest of the flux $\phi_1$ which links with the coil 1 to provide the torque does not change in spite of the change of the temperature and the change of the total flux $\phi$. Therefore, the effect of the temperature change is completely compensated for and the torque or the output of the motor does not change in spite of the change of the temperature.

Figure 4:
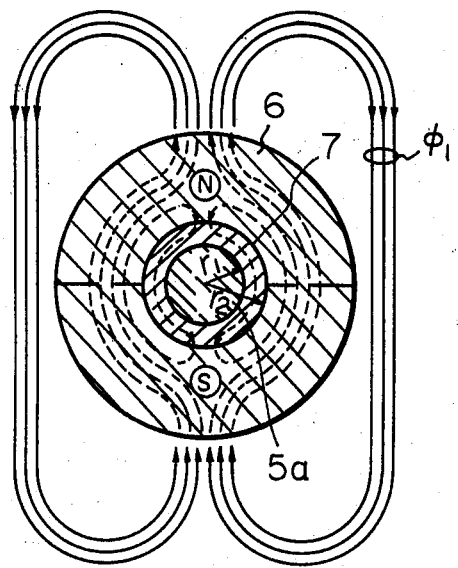
FIG. 4 is the cross sectional view of another motor according to the present invention.

FIG. 4 shows another cross sectional view of the rotor according to the present invention, in which the reference numeral $5a$ is a center steel shaft of the motor, 7 is a cylindrical body covering the shaft $5a$, and is coaxial with the center shaft $5a$. The reference numeral 6 is a permanent magnet made of a ferrite material. The feature of FIG. 4 is that the coaxial structure of the shaft $5a$ and the adjusting material 7. The inner axis $5a$ is made of steel, which has the constant magnetic characteristics irrespective of the change of the temperature, and the outer cover 7 is made of adjusting alloy which reduces the flux in a high temperature condition. In the embodiment of FIG. 4, the flux $\phi_1$ which links with the coil 1 can be constant irrespective of the change of the temperature, since the decrease and/or the increase of the flux in the adjusting cover 7 compensates the change of the total flux $\phi$ of the permanent magnet. It should be appreciated in the embodiment of FIG. 4 that the ratio of the radius $r_1$ of the shaft $5a$ to the radius $r_2$ of the adjusting cover 7 can adjust the characteristics of the motor. That is to say, said ratio $r_2/r_1$ is designed so that the external flux $\phi_1$ which links with the coil 1 is always constant irrespective of the change of the temperature.

As mentioned above in detail, according to the present invention, an axis or a spindle of a motor, or at least a part of the spindle of the motor is made of adjusting steel or adjusting alloy in which the flux decreases in the high temperature condition. Therefore, although the flux generated by a permanent magnet of ferrite material is decreased in a high temperature condition, that decrease of the total flux from the permanent magnet is compensated by the decrease of the flux in the adjusting material, and then, the external flux $\phi_1$ which links with a stator coil does not change, and thus, the torque of a motor can be constant irrespective of the change of the temperature.

Therefore, the present invention can provide a small size motor which can operate both in a low temperature condition and in a high temperature condition with relatively large torque.

From the foregoing it will now be apparent that a new and improved motor has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. In a pulse motor comprising a stator assembly having at least a yoke for providing a magnetic path and a coil wound on said yoke, and a rotor assembly rotatably inserted in said stator assembly, having at least an elongated spindle rotatably supported by said stator assembly and a cylindrical permanent magnet made of a ferrite material pierced by said spindle and being symmetrical with respect to said spindle so that the magnetic flux generated by said permanent magnet passes through the yoke of the stator assembly to link with the coil of the stator assembly, the improvement comprising:

said spindle being made of adjusting material having the magnetic characteristic that the magnetic reluctance of the same increases as the temperature of the same increases, and said yoke being made of steel having the magnetic characteristic that the magnetic reluctance of the same is relatively constant irrespective of the change of the temperature.

2. A motor according to claim 1, wherein said spindle comprises a coaxial arrangement of an elongated center steel shaft and a cylindrical adjusting material covering said steel shaft, said adjusting material has the magnetic characteristics that the magnetic reluctance increases as the temperature increases, and the magnetic reluctance of said steel shaft is constant irrespective of the change of the temperature.

* * * * *